United States Patent [19]

Thompson

[11] Patent Number: 4,499,933
[45] Date of Patent: Feb. 19, 1985

[54] MANUAL WORK-FEEDING DEVICE AND GUARD BODY FOR SHAPING MACHINES

[76] Inventor: Monty R. Thompson, 1015 E. Hyman, Aspen, Colo. 81611

[21] Appl. No.: 400,278

[22] Filed: Jul. 21, 1982

[51] Int. Cl.³ .............................................. B27C 5/04
[52] U.S. Cl. ................................. 144/134 A; 144/247; 144/249 R; 144/251 A; 144/253 J; 83/431; 83/447
[58] Field of Search ............... 144/134 R, 134 A, 247, 144/249 R, 253 J, 251 A; 83/431, 437, 447; 409/138; 51/28, 139, 215 SF

[56] References Cited

U.S. PATENT DOCUMENTS 2,864,415  12/1958  Mayer .............................. 144/253 J

FOREIGN PATENT DOCUMENTS 100338  10/1898  Fed. Rep. of Germany ... 144/249 R

Primary Examiner—W. D. Bray
Assistant Examiner—Jorji M. Griffin

[57] ABSTRACT

A manual work-feeding device and guard body for a shaping machine. The device provides direct access to the cutting tool and further provides for in-process visual inspection while protecting the operator from injury.

7 Claims, 3 Drawing Figures

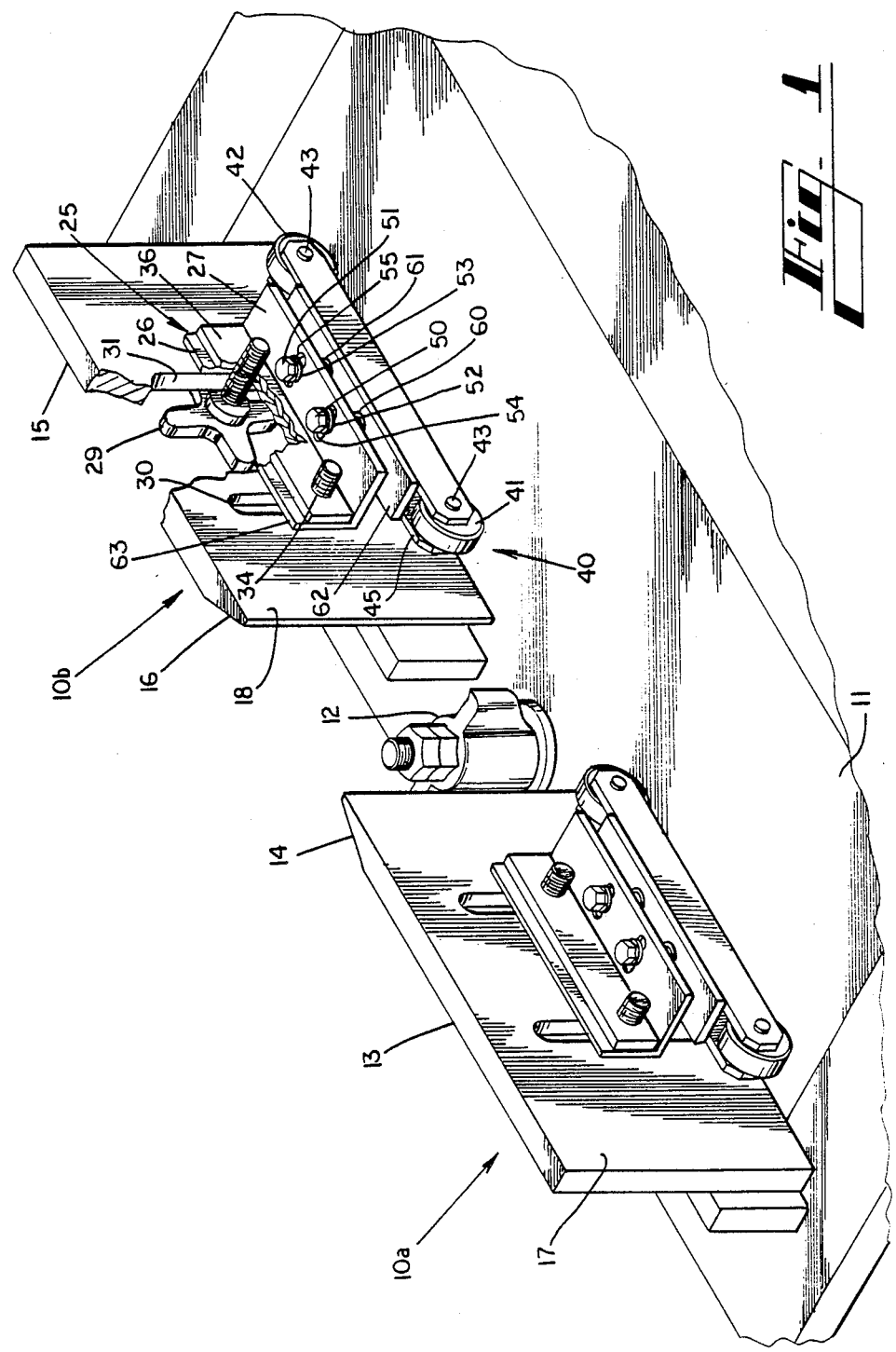

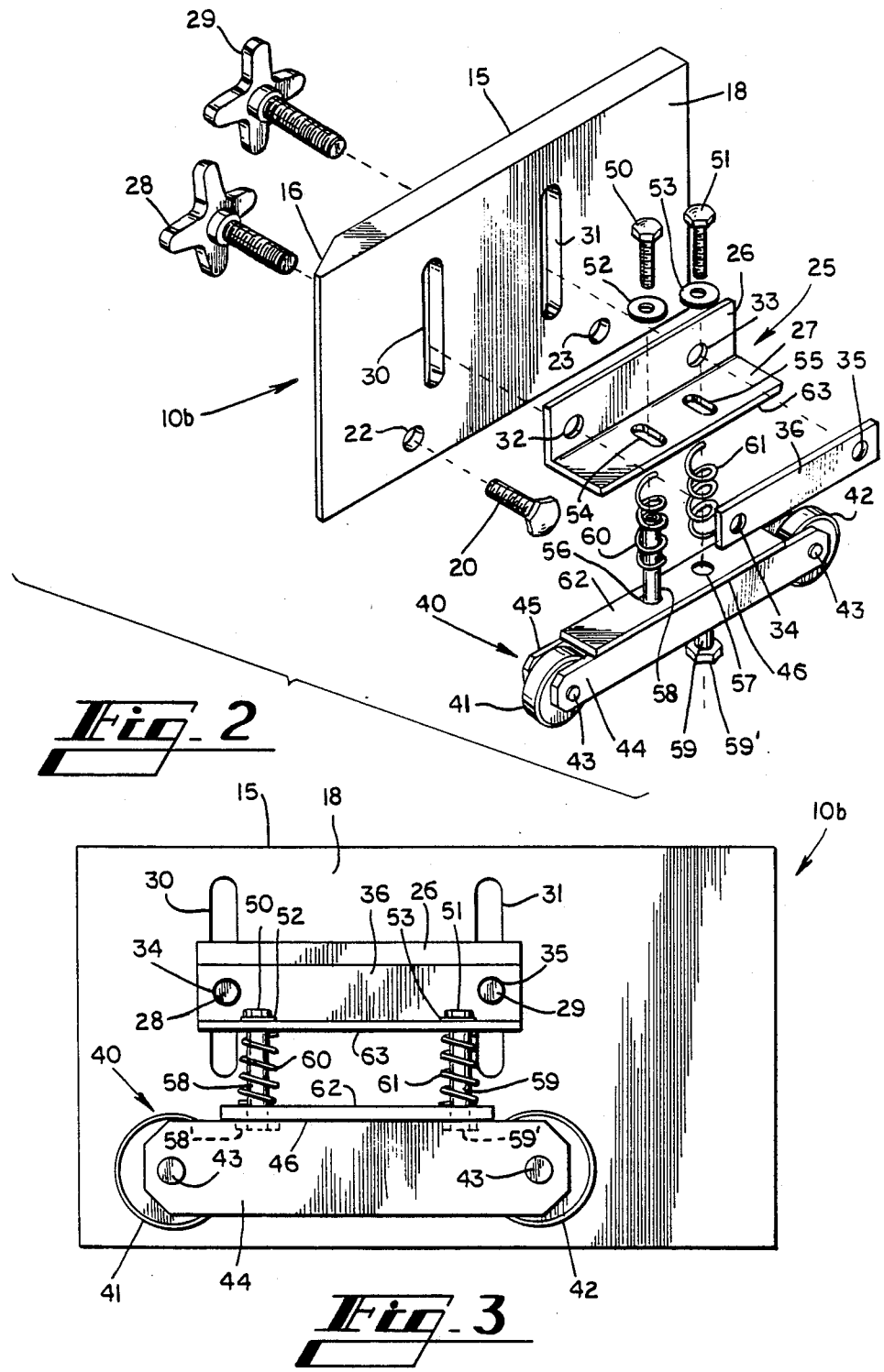

ced of the cutting tool. The prior art heretofore lacked a device that provided not only complete protection of the operator, but also provided simple and direct, visual and physical access to the cutting tool.

MANUAL WORK-FEEDING DEVICE AND GUARD BODY FOR SHAPING MACHINES

TECHNICAL FIELD

The present invention relates to work holders for woodworking machines, and more particularly relates to a manual work feeding device and guard body for a shaper.

BACKGROUND OF THE INVENTION

A shaper, as used in the art of woodworking, is a machine whereby a power-driven, rotating cutting device, mounted substantially perpendicular to and projecting above a work surface, engages a wooden workpiece. Operation of a shaper calls for the workpiece to be depressed against the work surface and then moved along a stationary guiding member into contact with the cutting tool. Use of a shaper without a work-feeding device and guard body requires the operator to manually depress and guide the workpiece, bringing the hands in hazardous proximity to the cutting device. Such manual operation of a shaper has long been recognized to be extremely dangerous and therefore, the need for a safe means of engaging the workpiece to the cutting tool has been known for many years.

Various types of work-feeding devices are known in the prior art purporting to fill this need. Problems have arisen, however, in the use of such devices because of their relative complexity. In particular, bulky mechanical devices have been provided in which the work-feeding apparatus is constructed so as to obstruct the operator's view of the workpiece as it engages the cutting head. Furthermore, since many of these devices automatically bring the workpiece into contact with the cutting device, the quality of workmanship is adversely affected because the operator may neither monitor, nor control, the progress of the workpiece. These problems are especially acute in the training of new operators as the experienced operator attempts to demonstrate the workings of a shaper to the novice.

Another problem is the servicing of the cutting tool. The elaborate design of existing prior art devices, power-driven or otherwise, necessitates removing, or at best repositioning, the work feeding device to allow for sharpening, cleaning, replacing or like servicing of the cutting tool. The prior art heretofore lacked a device that provided not only complete protection of the operator, but also provided simple and direct, visual and physical access to the cutting tool.

SUMMARY OF THE INVENTION

The present invention solves the above-described problems in the prior art by providing a manual work feeding device and guard body that facilitates viewing and control of the workpiece and access to the cutting tool while protecting the operator from injury.

Generally described, the manual work-feeding device and guard body of the present invention comprises a supporting frame suitably attached to the work surface of the shaper, a vertically adjustable guard body carried by the supporting frame in a manner overlying a workpiece on the work surface, and a horizontally adjustable plurality of rollers rotatably mounted on the guard body and extending therebelow so as to come into contact with a workpiece and resilient means for urging each of the rollers toward a workpiece, so as to depress the workpiece to the work surface as the operator guides the workpiece along the supporting frame to engage the cutting tool.

The supporting frame preferably comprises an upright guide or fence which projects above the work surface and serves as a guide for the edge of the workpiece which is to engage the cutting tool. The guard body comprises a mounting frame, which further comprises a vertical plate, and also a horizontally extending lower plate, which makes an L-shaped structure. The guard body is secured to the supporting frame by a plurality of threaded members rotatably mounted through a plurality of vertically aligned slots in the supporting fence, through a plurality of apertures in the vertical plate of the guard body and finally threaded into a nut bar. Rotation of these threaded members serves to secure or free the guard body to or from the supporting fence, thereby facilitating vertical adjustment of the slidably disposed guard body. The roller assembly is secured to the guard body by a plurality of threaded members which extend through a plurality of laterally aligned slots in the horizontally extending lower plate of the guard body, and are received by a plurality of stationary shafts which extend from the lower portion of the horizontally extending lower plate of the guard body through a plurality of openings in the horizontal plate of the roller assembly. A compression spring extends between the lower portion of the horizontal extending lower plate of the guard body and the uppermost part of the roller assembly in conjunction with each stationary shaft. The compression springs urge each roller toward the workpiece with a constant force which in turn urges the workpiece toward the work surface. Rotation of these threaded members allows the stationary shafts to travel laterally within the laterally aligned slots to thus provide lateral adjustment of the roller assembly. The outermost lateral portion of roller assembly serves to protect the operator by functioning as a guard fence, preventing the hands of the operator from coming into hazardous proximity with the cutting tool. The novel construction of the invention also serves to provide simple and direct access to the principle parts of the shaper as hertofore lacking in the prior art.

Thus, it is an object of the present invention to provide an improved work feeding device and guard body for the protection of an operator of a shaper.

It is a further object of the present invention to provide a work feeding device and guard body that allows the operator to monitor the progress of a workpiece as it engages the cutting tool.

It is a further object of the present invention to provide a work feeding device and guard body that gives the operator greater control over the shaping of the workpiece.

It is a further object of the present invention to provide a work feeding device and guard body that permits direct access to the cutting tool without the removal or repositioning of the device.

It is a further object of the present invention to provide a work feeding device and guard body that facilitates viewing of the workpiece from remote locations so as to further facilitate the training and education of new operators.

Other objects, features and advantages of the present invention will become apparent from reading the following specification when taken in conjunction with the accompanying drawing.

BRIEF DESCRIPTION OF THE DRAWINGS

FIG. 1 is a pictorial view of an embodiment of the manual work feeding device and guard body for shaping machines according to the present invention with a cut-away portion to aid in demonstrating the proper use of the present invention.

FIG. 2 is an exploded pictorial view of the embodiment shown in FIG. 1.

FIG. 3 is a front view of the embodiment shown in FIG. 1.

DETAILED DESCRIPTION

Referring now in more detail to the drawing, in which like numerals indicate like parts throughout the several views, FIG. 1 shows a work table 11 of a shaper, which usually consists of a heavy wooden or metal surface. A rotary-driven cutting tool 12 is mounted substantially perpendicular to the projects above the work table 11 in the usual and well known manner. FIG. 1 further shows two manual work feeding and guard body devices 10a and 10b for shaping machines to be mounted upon and bolted or otherwise secured to the work table 11 of a conventional shaping machine. The details of such mounting are well known in the woodworking art and are beyond the scope of this invention.

The right-hand or work-entering feeding device and guard body 10a comprises a supporting fence 13 having a beveled, vertical edge 14 facing the cutting tool 12. The left-hand or work-leaving feeding device and guard body also comprises a supporting fence 15 having a beveled, vertical edge 16 facing the cutting tool 12. The supporting fences 13 and 15 extend vertically above the work table 11 for the purpose of acting as a guide fence for the edge of the board which is to engage the cutting tool 12. Proper use of the invention calls for the wooden workpiece to be pressed tightly against and moved along the front faces 17 and 18 of the supporting fences 13 and 15, respectively, thereby engaging the cutting tool 12. The inner, beveled edges 14 and 16 act as wood chip deflector plates, substantially enclosing the space on either side of the cutting tool 12 to deflect chips away from and protect against injury to the operator. Since these devices 10a and 10b are otherwise identical, only one will be described in detail.

The present embodiment in FIG. 2 and FIG. 3 shows a manual work feeding device and guard body 10b mounted upon the work table 11 by two bolts 20 (one bolt omitted from FIG. 2 for clarity) passing through a pair of openings 22 and 23 to thereby interconnect the supporting fence 15 and the work table 11. The bodies 10a and 10b may be fastened to existing support structure on the shaper, replacing the conventional guide fences. A mounting frame 25 comprises a vertical plate 26 and a horizontal plate 27 secured to the bottom of the vertical plate 26 and extending laterally outward therefrom to make a somewhat L-shaped structure. The mounting frame 25 may therefore comprise an angle iron. The mounting frame 25 is secured to the work engaging surface 18 of the supporting fence 15 by a pair of rotatably mounted threaded members 28 and 29. These threaded members 28 and 29 extend freely from behind the supporting fence 15 through a series of apertures, the first being a pair of vertically parallel slots 30 and 31 in the supporting fence 15, then through a pair of openings 32 and 33 in the vertical plate 26 of the mounting frame 25, to finally engage a matched pair of threaded openings 34 and 35 in a nut bar 36.

A roller assembly 40 comprises two wheels 41 and 42 mounted at the outermost portions of the roller assembly 40 on a shaft 43 extending laterally between two vertical plates 44 and 45. A horizontal plate 46 is secured to and extends between the top edge of vertical plates 44 and 45. The roller assembly 40 is secured to the mounting frame 25 by a pair of rotatably mounted threaded members 50 and 51 freely extending through two washers 52 and 53, then through two laterally parallel slots 54 and 55 in the horizontal plate 27 of the mounting frame 25 and finally received by a pair of stationary shafts 58 and 59. The center of each stationary shaft 58 and 59 is tapped to receive the threaded members 50 and 51. Stationary shafts 58 and 59 freely extend therebelow through two openings 56 and 57 in the horizontal plate 46 of the roller assembly 40; each stationary shaft 58 and 59 has respective retaining bases 58', 59' to prevent separation of the shafts 58 and 59 from the roller assembly 40. Two springs 60 and 61 encase the shafts 58 and 59, and bear against the top side 62 of the horizontal plate 46 of the roller assembly 40 and the lower side 63 of the horizontal plate 27 of the mounting frame 25 to thus provide a constant downward pressure on the roller assembly 40.

To accommodate workpieces of varying width and thickness, the manual work feeding device and guard body 10b provides a novel construction permitting vertical and lateral adjustment of the roller assembly 40. Counterclockwise rotation of threaded members 28 and 29 will serve to free the nut bar 36 from the slidably disposed mounting frame 25, permitting vertical adjustment of the attached roller assembly 40 according to the thickness of the workpiece. Clockwise rotation of the threaded members 28 and 29 will secure the mounting frame 25 to the supporting fence 15 in the appropriate position. Lateral adjustment of the roller assembly 40 is accomplished in similar fashion by rotation of the threaded members 50 and 51 to free the stationary shafts 58 and 59, respectively, from being pinched against the lower side 63 of the mounting frame 25. Thus, stationary shafts 58 and 59, in tandem with mated threaded members 50 and 51, can travel within the slots 54 and 55 of the horizontal plate 27, thereby facilitating lateral adjustment of the roller assembly to accommodate workpieces of varying thickness.

The novel construction of the present invention further contemplates lateral adjustment of the roller assembly 40 at a slight angle to aid the operator in engaging the workpiece to the cutting tool 12. Such an adjustment is accomplished by counterclockwise rotation of threaded members 50 and 51 to free stationary shafts 58 and 59 from the lower side 63 of the mounting frame 25. The left stationary shaft 58 is then positioned and secured nearer the work engaging surface 18 than the right stationary shaft 59. This angled alignment of the roller assembly 40 directs the workpiece toward the supporting fence 15 and thereby assists the operator in moving the workpiece along the work-engaging surface 18.

In operation of the invention, two manual work feeding and guard body devices are mounted upon the work table 11 as shown in FIG. 1 with the cutting tool 12 mounted in a vertical direction substantially perpendicular to the work table 11 and extending into the gap created by the supporting fences 13 and 15. Vertical and lateral adjustment of the roller assemblies 40 is facilitated by the novel construction of the present invention as previously described. After such adjustment, the workpiece is placed under the roller assembly 40 and pressed tightly against the work-engaging surface 17 of the work-entering feeding and guard body device 10a. The workpiece is engaged to the cutting tool 12 by moving the workpiece along the supporting fence 13 past the cutting tool 12 into contact with the work-engaging surface 18 of the right-hand feeding and guard body device 10b.

It will thus be seen that an apparatus embodying the present invention enjoys many advantages over prior art devices. The present invention described above is much less complex than prior art devices in that it is easier and more economical to operate, construct and maintain. The present device, as a result of said improvements, not only facilitates viewing of the workpiece as it engages the cutting tool, but permits servicing of the cutting tool without repositioning or removing the device. Thus, the present invention provides direct physical and visual access to the principle parts of a shaper as heretofore unprovided in the prior art.

While this invention has been described in detail with particular reference to preferred embodiments thereof, it will be understood that variations and modifications can be effected within the spirit and scope of the invention as described hereinbefore and as defined in the appended claims.

I claim:

1. A manual work feeding device and guard body for a shaping machine including a work table and a cutting tool mounted on said work table, comprising:
   a supporting fence having a pair of substantially parallel, substantially vertical slots;
   a mounting frame secured to said supporting fence by two interconnecting members extending through said pair of vertical slots in said supporting fence so as to position said mounting frame over a workpiece on said work table, said mounting frame being vertically adjustable within the limits of said pair of vertical slots in said supporting fence,
   said mounting frame further comprising a horizontal portion having a pair of substantially parallel, substantially horizontal slots, said pair of horizontal slots being aligned so as to be substantially perpendicular to said supporting fence;
   a roller assembly comprising a pair of rollers, said roller assembly being mounted upon said mounting frame by a first pair of threaded members extending through said pair of horizontal slots in said horizontal portion of said mounting frame so that said rollers extend therebelow and come into contact with said workpiece on said work table, said roller assembly being horizontally adjustable within the limits of said pair of horizontal slots in said horizontal portion of said mounting frame so as to direct said workpiece against said supporting fence; and
   resilient means for urging each of said rollers against the workpiece, so as to depress the workpiece to the work table as the workpiece is simultaneously directed against said supporting fence.

2. The apparatus of claim 1, wherein said mounting frame further comprises a vertical member integrally formed with said horizontal member, said vertical member having a pair of openings positioned for passage therethrough of said two interconnecting members extending through said pair of vertical slots in said supporting fence.

3. The apparatus of claim 1, further comprising a pair of stationary shafts operatively associated with said resilient means for retaining said roller assembly upon said mounting frame and retaining means secured at the base of said stationary shafts for defining the lowermost position of said pair of rollers relative to said mounting frame.

4. The apparatus of claim 3, wherein said resilient means comprises a pair of compression springs extending between and bearing upon said mounting frame and said roller assembly.

5. The apparatus of claim 1, wherein said roller assembly comprises an outer, substantially vertical plate for preventing a hand of a user from contacting said cutting tool or said rolers.

6. The apparatus of claim 4, wherein each of said first pair of threaded members is telescopically received by said stationary shafts, and said springs are encasing said stationary shafts.

7. A manual work-feeding device and guard body for a shaping machine including a work table and a cutting tool mounted on said work table, the invention comprising:
   a supporting fence having a pair of vertical slots;
   a mounting frame including a vertical and a horizontal plate, said horizontal plate having a pair of horizontal slots positioned so as to be perpendicular to said supporting fence;
   a first pair of threaded members slidably disposed in said pair of vertical slots in said supporting fence for interconnecting said supporting fence and the vertical plate of said mounting frame;
   a roller assembly including a horizontal plate;
   a second pair of members slidably disposed in said pair of horizontal slots in said horizontal plate of the mounting frame for interconnecting said roller assembly and said mounting frame;
   a pair of stationary shafts operatively associated with said second pair of members for interconnecting said mounting frame and said roller assembly wherein each of said second pair of said threaded members is telescopically received by said stationary shafts;
   a pair of retaining bases secured to the base of said stationary shafts for defining the lowest position of said rollers of said roller assembly; and a pair of
   compression springs encasing said stationary shafts and bearing upon said horizontal plate of said mounting frame and said horizontal plate of said roller assembly for urging each of said rollers toward the workpiece, so as to depress the workpiece to the work table.

* * * * *